United States Patent [19]

Hsu

[11] Patent Number: 4,855,736
[45] Date of Patent: Aug. 8, 1989

[54] ELECTRONIC PARKING SENSOR APPARATUS

[76] Inventor: Chi-Heng Hsu, 8-2 Alley 48, Lane 278, Yung-Chi Rd., Taipei R.O.C., Taiwan

[21] Appl. No.: 202,121

[22] Filed: Jun. 3, 1988

[51] Int. Cl.$^4$ .......................... G08G 1/00; B60Q 1/00
[52] U.S. Cl. ...................................... 340/901; 340/436; 340/437; 340/665; 200/61.41; 200/61.42; 200/61.44; 116/28 A
[58] Field of Search ................... 340/901, 903, 51, 61, 340/52 H, 665, 668, 687; 200/61.41, 61.42, 61.43, 61.44; 116/28 R, 28 A

[56] References Cited

U.S. PATENT DOCUMENTS

| | | | |
|---|---|---|---|
| 2,270,687 | 1/1942 | Morse | 200/61.44 |
| 2,786,910 | 3/1957 | Tyska | 200/61.44 |
| 2,813,940 | 11/1957 | Poet | 200/61.44 |
| 2,847,527 | 8/1958 | Wolters | 200/61.44 |
| 2,930,862 | 3/1960 | Samaniego | 200/61.44 |
| 2,986,113 | 5/1961 | Frees et al. | 200/61.44 |
| 3,990,040 | 11/1976 | Gleitz et al. | 340/61 |
| 4,237,446 | 12/1980 | Roberts | 340/61 |

FOREIGN PATENT DOCUMENTS 1253843  1/1961  France .................. 340/61

Primary Examiner—Donnie L. Crosland
Attorney, Agent, or Firm—Sheldon & Mak

[57] ABSTRACT

A parking sensor having a base for attaching to a vehicle, a flexible probe for contacting an impending obstruction, a contact for producing an electrical signal responsive to deflection of the probe, a lamp, buzzer, or other transducer for indicating the electrical signal, and a filter for preventing operation of the transducer during spurious occurrences of the electrical signal. The filter can include a timer for activating the transducer when the electrical signal continues beyond a first interval, which can be from 0.05 to 1.0 second. Also, the timer prevents activation of the transducer beyond a second, longer interval that is typically 10 to 40 seconds for terminating the indication (and power drain) when further corrective action by an operator of the vehicle is unlikely. Further, a battery-powered radio transmitter on the base signals a receiver in the vehicle for driving the transducer, power to the transmitter being controlled by a limiter that can include the filter for preventing power drain except when the transducer is to be activated. The receiver can also be battery-powered and provided with a motion detector for breaking the receiver battery connection when the vehicle remains at rest. Separate front and rear transmitter units can operate on different signal frequencies for separately indicating front and rear contact with the obstruction.

27 Claims, 2 Drawing Sheets

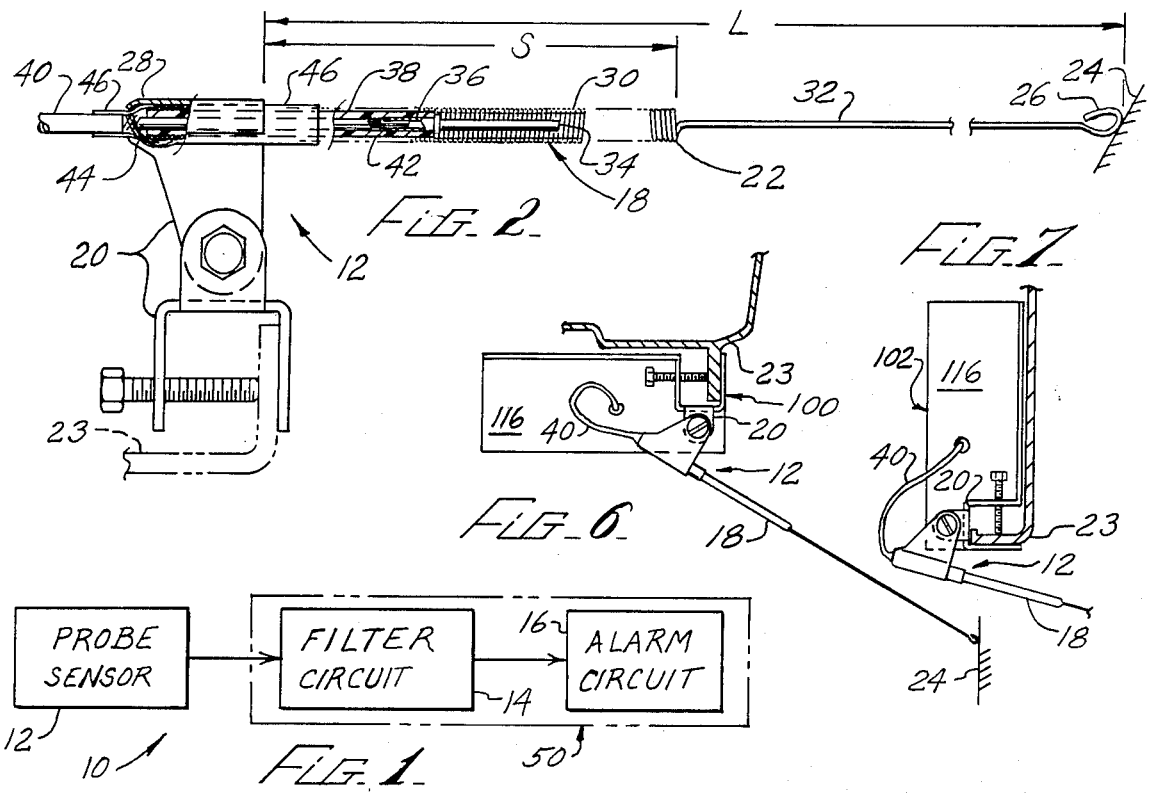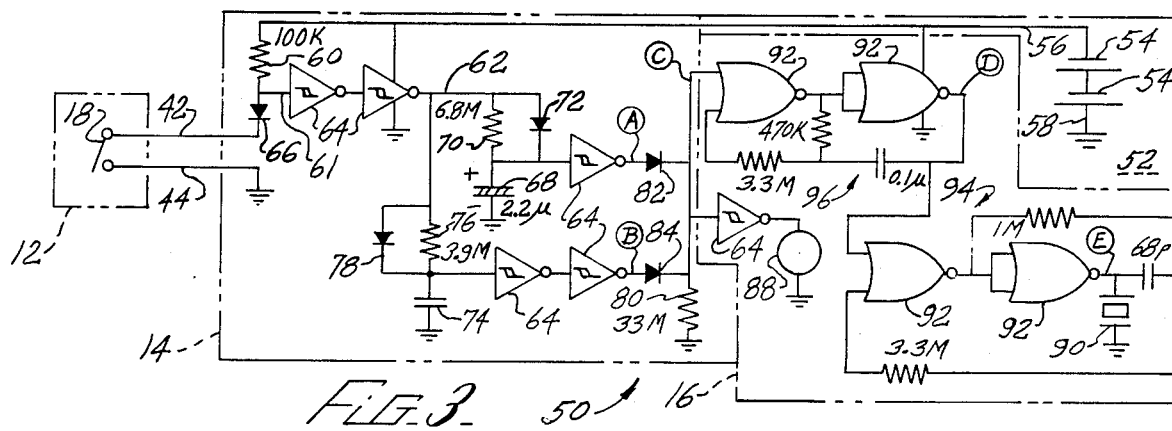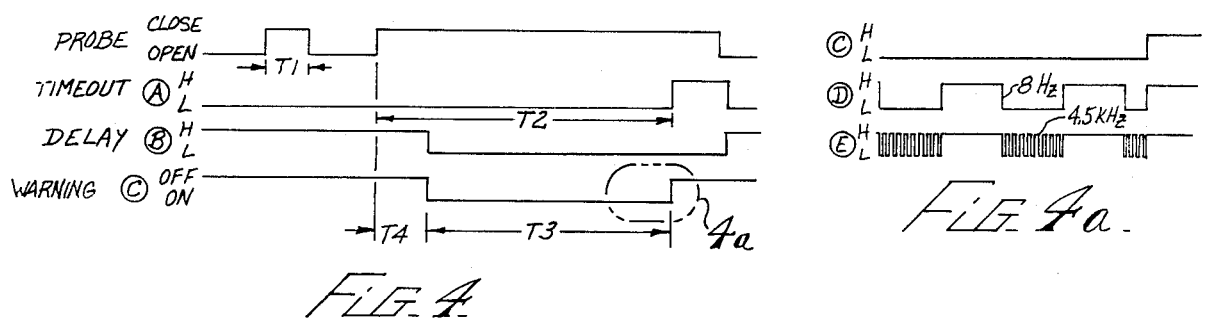

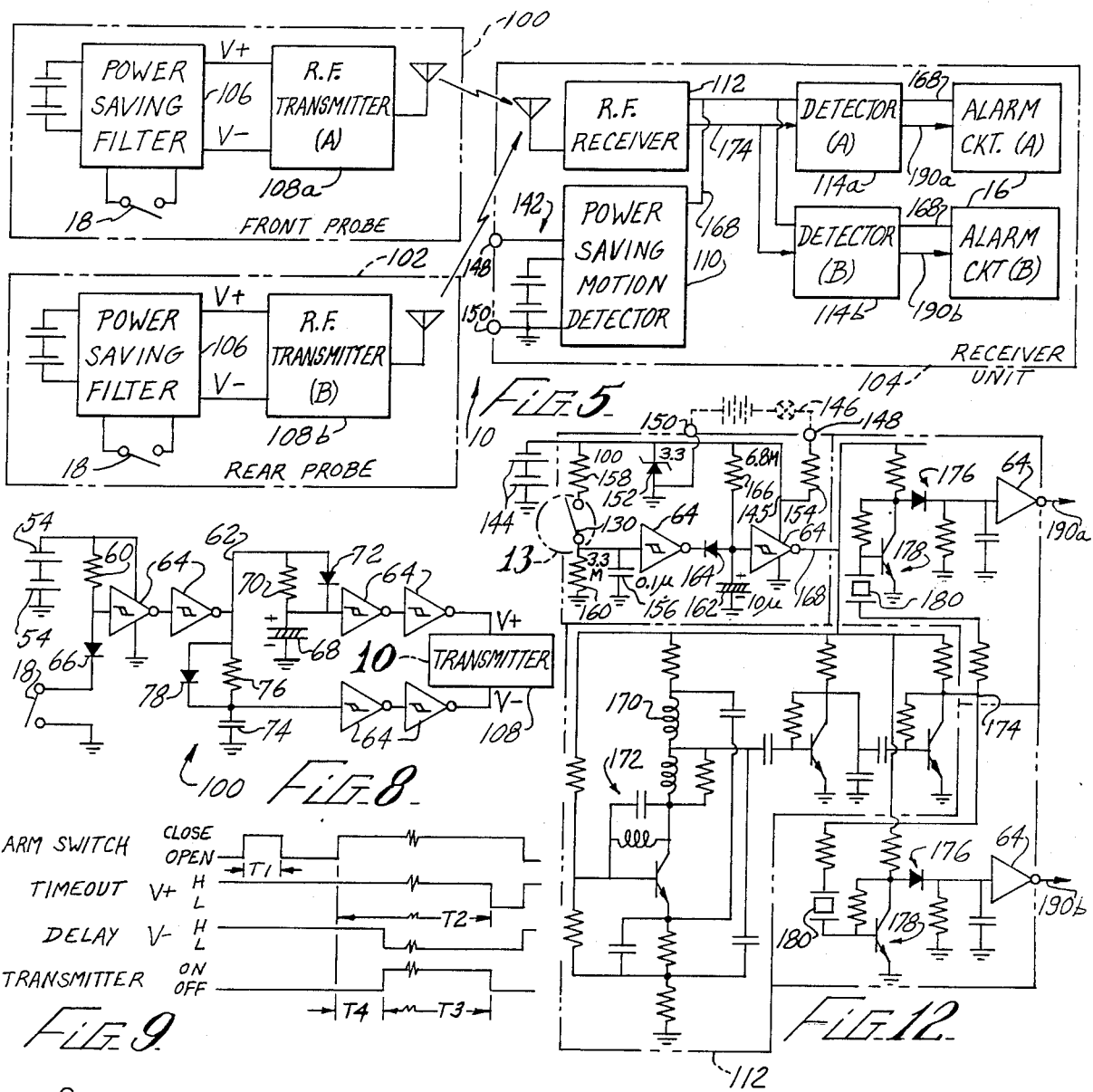

ELECTRONIC PARKING SENSOR APPARATUS

BACKGROUND

The present invention relates to vehicle obstruction sensing and more particularly to a vehicle curb sensor.

Curb sensors for use facilitating vehicle parking conventionally employ a deflectable probe that is adjusted to rub against an obstruction when there is a predetermined clearance between the obstruction and the vehicle itself. An audible signal is produced from the probe as it rubs against the obstacle. Typically, a separate sensor is used on the curb side at each end of the vehicle. It is also known to generate an electrical signal that is responsive to contact between the probe and the obstruction for operating warning devices such as lamps, buzzers, and the like. Use of such electrical devices is appropriate for helping to distinguish between signals from the front and rear probes, especially when there are high levels of background noise, and when the user has impaired hearing.

The electrical parking sensors of the prior art exhibit a number of disadvantages, such as one or more of the following:

1. They are difficult to install in that they must be connected to a switched node of the vehicle electrical system to avoid excessive discharge of the vehicle battery when the vehicle is left unattended. A switched node, such as at the ignition switch is typically relatively inaccessible. Also, there must be additional wiring between exterior locations proximate the vehicle wheels to a location within the vehicle, wihch is awkward to provide.

2. The electrical warning devices are annoying in that the warning signal persists while the vehicle is at rest. Also, false warning indications are produced by random vibrations of the probes, such as is produced by the wind when driving at high speed.

Thus there is a need for a vehicle parking sensor that is effective for distinguishing front and rear obstructions in the presence of noise and for use by those having impaired hearing, which is inexpensive to produce and, most particularly, easy to install.

SUMMARY

The present invention is directed to a parking sensor apparatus that meets this need. In one aspect of the invention, the apparatus includes a base for attaching to an external structure of the vehicle, a probe for contacting an impending obstruction and having a first end proximate the base and a second end capable of deflecting relative to the base, means for producing a contact signal in response to a predetermined deflection of the probe, filter means responsive to the contact signal for producing a warning signal, the filter means being adapted for preventing occurrence of the warning signal in response to spurious occurrences of the contact signal, and transducer means for indicating the warning signal to the operator. The filter means can include timer means for producing the warning signal following continuous occurrence of the contact signal for a predetermined first period of time. Thus the present invention advantageously prevents occurrence of the warning signal in response to spurious occurrences of the contact signal that last for less than the first period of time, such as when the vehicle encounters a bump in the road and vibration of the probe is produced by the wind during high speed operation of the vehicle.

Preferably the first period of time of the filter means is between approximately 0.05 seconds and approximately 1.0 seconds for rejecting a large proportion of spurious contact closures while providing a reasonably quick response to a genuine obstruction. More preferably the first period of time is approximately 0.2 seconds.

An important aspect of the present invention is that the timer means includes means for preventing occurrence of the warning signal upon continuous occurrence of the contact signal beyond a predetermined second period of time that is greater than the first period of time. The second period of time can be approximately twenty times the magnitude the first period of time. More preferably the second period of time is between approximately 10 seconds and approximately 40 seconds for maintaining the warning signal sufficiently before reasonable corrective action is taken by the operator, yet preventing the warning signal when further corrective action is unlikely.

For these purposes, the timer means can include: (a) a delay circuit for holding an enable signal at a rest level and, at the end of the first period of time, an enable level; (b) a timeout circuit for holding a valid signal at a rest level and, at the end of the second period of time, a disable level; and (c) means for producing the warning signal only. The transducer means can include visual display means for effectively signaling the operator when auditory means would otherwise be ineffective. The transducer means can include a sound producing means that is operatively connected to the warning signal.

In another important aspect of the invention, the apparatus includes battery means and radio transmitter means on the base, the transmitter means being powered by the battery means for producing a radio transmission from the probe in response to the contact signal, and radio receiver means for receiving the transmission inside the vehicle for operating the transducer means. Preferably the apparatus further includes limiting means for conserving power in the battery means by limiting operation of the transmitter means in response to the contact signal. The limiting means can include the filter means whereby the transmitter means operates only when the warning signal is present.

In another important aspect of the invention, the receiver means and the transducer means are powered by a receiver battery means, the apparatus further including motion detector means for preventing power consumption by the receiver means and the transducer means during periods of inactivity of the vehicle. The receiver battery means can include provisions for connecting the receiver means and the transducer means to an electrical system of the vehicle. Thus an adequate electrical supply for the receiver and the transducer is assured whenever the vehicle is being operated, yet the required power connections do not require long runs between sources of available power and the exterior of the vehicle proximate the wheels. Further, the vehicle electrical power can be from an unswitched source such as a cigarette lighter socket for facilitating installation of the apparatus.

The apparatus can include first and second detector units for mounting in respective locations on the vehicle, each detector unit including one of the base, probe, filter means, battery means, and transmitter means, the first detector unit transmitting at a first signal frequency and the second detector unit transmitting at a different signal frequency.

DRAWINGS

These and other features, aspects, and advantages of the present invention will become better understood with reference to the following description, appended claims, and accompanying drawings where:

FIG. 1 is a functional block diagram of a vehicle parking sensor according to the present invention;

FIG. 2 is a fragmentary sectional inverted elevational view of a probe assembly for use in the apparatus of FIG. 1;

FIG. 3 is a circuit diagram of the apparatus of FIG. 1;

FIG. 4 is a timing diagram of the apparatus of FIG. 1;

FIG. 4a is a detail timing diagram of the apparatus of FIG. 1 within region 4a of FIG. 4;

FIG. 5 is a block diagram of an alternative configuration of the apparatus of FIG. 1;

FIG. 6 is a fragmentary sectional elevational view of a transmitter unit of the apparatus of FIG. 5 in use installed on a vehicle;

FIG. 7 is a fragmentary sectional elevational view showing an alternative installation configuration of the unit of FIG. 6 on another vehicle;

FIG. 8 is a circuit diagram of the transmitter unit of FIG. 6;

FIG. 9 is a timing diagram of the transmitter unit of FIG. 6;

FIG. 10 is a diagram showing an exemplary transmitter circuit for the transmitter unit of FIG. 6 within region 10 of FIG. 8;

FIG. 11 is an oblique elevational perspective view of a receiver unit of the apparatus of FIG. 5 in use in the interior of a vehicle;

FIG. 12 is a circuit diagram of the receiver unit of FIG. 11;

FIG. 13 is a fragmentary sectional perspective view of a circuit element of the receiver unit of FIG. 11 within region 13 of FIG. 12.

DESCRIPTION

The present invention is directed to an electronic vehicle parking sensor apparatus that signals the close approach to obstacles such as curbs. With reference to the drawings, and especially FIGS. 1–3, a sensor apparatus 10 includes a probe sensor 12 that is operatively coupled through a debounce or filter circuit 14 to an alarm circuit 16. The sensor 12 includes a probe switch 18 having an adjustable rigid support clamp 20 and an outwardly extending flexible arm member 22, the support clamp 20 being adapted for clamping attachment to a vehicle structure 23 in a conventional manner. The arm member 22 is rigidly mounted to the support clamp 20 at a first end 26 of the arm member 22 and is adapted for contacting an obstruction 24 at a second end 28 thereof, the second end 28 extending a distance L from the support clamp 20. The arm member 22 is formed from an elongated spring material, including a conductive coil portion 30 that extends a coil distance S from the support clamp 20, the distance S being typically less than half of the length L. For example, the coil portion 30 can have a length of 90 mm, the distance S being about 70 mm, and the overall length of the arm member 22 can be 330 mm, the distance L being about 310 mm. The arm member 22 can be made from spring-tempered steel wire having a diameter of approximately 2 mm.

An integrally formed rod portion 32 of the arm member 22 extends between the coil portion 30 and the second end 28, the rod portion 32 being formed as a straight section of the spring material. A metallic contact pin 34 is mounted within the coil portion 30 for making electrical contact therewith when the arm member 22 is deflected in response to physical contact with the obstruction 24. For this purpose, a shank portion 36 of the pin 34 is fixably inserted into a tube member 38 within the coil portion 30, the tube member 38 extending from the first end 26 of the arm member 22 and locating the pin 34 coaxially within the coil portion 30. The tube member 38 can be made from a flexible plastic material for electrically isolating the pin 34 from the arm member 22 until the arm member 22 is deflected by contact with the obstruction 24. The probe switch 18 is provided with a flexible electrical cable 40 for connection to the filter circuit 14, the cable 40 having a first conductor 42 connected to the pin 34, and a second conductor 44 connected to the arm member 22 at the first end 26 thereof. As shown in FIG. 2, the second conductor 44 is a braided shield surrounding the first conductor 42 within the cable 40. An insulating sleeve 46 encloses the arm member 22 within the support clamp 20 for electrically isolating the arm member 22 from the support clamp 20, which is typically grounded to the vehicle when installed.

The configuration of the arm member 22 described above, having the relatively short coil portion 30 and the relatively stiff, small diameter rod portion 32, advantageously provides a readily responsive electrical contact of the switch 18 when the second end 28 encounters an obstruction, yet unwanted vibration of the arm member 22 due road bumps and windage is avoided. This is because the rod portion 32, although at a high mechanical advantage, contributes minimally to both wind resistance and inertial moments about the coil portion 30 proximate the pin 34. Moreover, deflections of the arm member 22 are advantageously concentrated proximate the pin 34.

The filter circuit 14 and the alarm circuit 16 are included in an alarm unit 50 that is equipped with battery means 52, shown in FIG. 3 as a pair of 1.5 volt cells 54 connected to produce 3 volts on a supply bus 56 relative to a signal ground 58. The probe switch 18 is operatively connected between the signal ground 58 and a pull-up resistor 60 that is powered from the supply bus 56 for producing a contact signal 61. A switch signal 62 is driven by a series pair of inverting hysteresis amplifiers or Schmitt trigger inverters 64 from the contact signal 61 in response to contact closures of the switch 18. Thus the switch signal 62 is buffered from the switch 18 itself and stripped of at least some contact transients by virtue of the hysteresis of the inverters 64, which are provided with appropriate common power connections to the supply bus 56 and ground. The inverters 64 are preferably made from low power complementary drive integrated circuit technology. For example, the inverters 64 can be elements of 74HC14 CMOS circuits that are commercially available from a variety of sources.

In order to further avoid false activation of the switch signal 62 in response to electrical interference as well as humidity or contamination-caused current leakage across the switch 18, the ground connection to the switch 18 is through the second conductor 44, a contact signal on the first conductor 42 being shielded by the second conductor 44. Also, the first conductor 42 is connected to the inverters 64 through a dropping diode 66. When the probe sensor 12 is deflected by contact with the obstruction 24, the switch 18 closes, and the voltage into the first of the inverters 64 is lowered to about 0.45 V, which is below the negative-going input threshold of the inverters 64; thus the switch signal 62 is driven to ground level.

When the switch 18 is open, its resistance can be from very large to as low as about 50K ohm when moisture is present. With a preferred value of 100K for the pull-up resistor 60, the voltage into the first of the inverters is 1.3 V or more, which is more than the positive-going threshold voltage. Thus the switch signal is driven to the supply level unless the leakage resistance is less than about 30K.

The switch signal 62 is operatively connected through timer circuitry of the filter circuit 14 for producing a warning signal C as designated in FIGS. 3 and 4 and described herein. A timeout signal A is produced by another of the inverters 64 that has its input connected to a grounded electrolytic timeout capacitor 68, the timeout capacitor 68 being discharged from the switch signal 62 through a timeout resistor 70 when the switch signal 62 is at ground as a result of the switch 18 being closed. The capacitor 68 and timeout resistor 70 are selected to provide a relatively great discharge time on the order of several seconds to one minute during which the timeout signal A remains low following closure of the switch 18. When the switch 18 opens, the timeout capacitor 68 is rapidly charged to the supply level from the switch signal 62 through a first charging diode 72 for quickly returning the signal A to the low level.

A delay signal B is produced by a further series pair of the inverters 64, the first having its input connected to a grounded delay capacitor 74, the delay capacitor 74 being discharged from the switch signal 62 through a delay resistor 76 when the switch signal 62 is at ground as a result of the switch 18 being closed. The capacitor 74 and delay resistor 76 are selected to provide a relatively short discharge time on the order of a fraction of a second during which the delay signal B remains high following closure of the switch 18. When the switch 18 opens, the delay capacitor 74 is rapidly charged to the supply level from the switch signal 62 through a second charging diode 78 for quickly returning the signal B to the high level.

The warning signal C, which is active-low and biased to ground by a pull-down resistor 80, is disabled or pulled high whenever a high level is present at either the timeout signal A or the delay signal B, by means of respective first and second logic diodes 82 and 84 that are connected therebetween. Thus the warning signal C remains inactive high upon occurrence of a contact closure of the probe switch 18 for an interval T1 that is less than the delay interval. However, when the contact closure lasts longer than the delay interval, designated T4 in FIG. 4, the warning signal is activated thereafter for as long as the contact closure remains, except that if the contact closure lasts longer than the timeout interval, designated T2, the warning signal is terminated prematurely, remaining active for an interval T3 that is the difference between the timeout interval T2 and the delay interval T4.

It is preferred that the delay interval T4 be selected from about 0.05 second to about 1.0 second for preventing the warning signal when there are only spurious contact closures due to bumps and the like that are encountered by the vehicle, and due to wind-produced vibration of the arm member 20 under high-speed driving. More preferably, the delay interval is from about 0.1 to about 0.5 second. Most preferably, the delay interval T4 is approximately 0.2 second for quick response of the warning signal with effective prevention of spurious warnings. Also, the timeout interval T2 can be approximately 20 times the delay interval, preferably being selected between about 10 seconds and about 40 seconds for preventing an annoying excessively continuing warning should the vehicle be parked with the probe sensor 12 deflected by the obstruction 24, yet continuing the warning sufficiently long that the apparatus 10 is responsive to further reasonably prompt maneuvers of the vehicle. More preferably, the timeout interval T2 is approximately 25 seconds, that interval being sufficiently long for normal corrective movements of the vehicle to be made.

The alarm circuit 16 provides indication of the warning signal C to the vehicle operator, the indication typically including at least one of visual and audio stimuli. As shown in FIGS. 3 and 4a, a visual stimulus is provided by a grounded optical transducer 88 that is driven by another of the inverters 64 from the warning signal C. The optical transducer 88 can be a conventional lamp, a light-emitting diode, a liquid crystal cell, or the like. An audio stimulus is provided by a piezoelectric crystal buzzer 90 that is driven by bursts of a buzzer signal E produced by a pair of CMOS NOR gates 92 connected as a buzzer oscillator 94. An enable signal D for controlling the oscillator 94 is generated by another pair of the NOR gates 90 that are connected as an enable oscillator 96 which is activated by a low level of the warning signal C. Both pairs of the NOR gates 90 are provided in a single CMOS integrated circuit designated 74HC02 which is available commercially from conventional sources. As shown in FIG. 3, the circuit values of an exemplary embodiment of the invention are chosen to provide the buzzer signal E at approximately 4.5 kHz, in bursts at approximately 8 Hz, 50% duty cycle.

An important advantage of the present invention is that very little battery power is required. For example, the apparatus 10 as shown in FIG. 3, but without the optical transducer 88, requires less than about 3 uA when the probe switch 18 is open, and less than about 1 mA when the alarm circuit 16 is activated. When the probe switch 18 is closed, but with the alarm circuit 16 disabled, only about 0.03 mA is required with 3 volts applied to the supply bus 56. This corresponds to a battery life of about two years with a pair of readily available type UM-5 battery cells.

With further reference to FIGS. 5-13, another and important embodiment of the sensor apparatus 10 includes front and rear probe units 100 and 102, respectively, that activate a receiver unit 104 which can be remotely located within the vehicle. In this embodiment, it is possible to install the apparatus 10 in a vehicle without the need to route wiring between the interior and exterior of the vehicle, greatly facilitating installation. As shown in FIG. 5, each of the probe units 100 and 102 is battery powered, including a power saving filter 106 that is operatively connected to a corresponding probe switch 18 for activating an R.F. radio transmitter 108, designated transmitter 108a and transmitter 108b, respectively. As further described below, the transmitters 108a and 108b differ in that each produces a radio signal that is distinguishable from the other by the receiver unit 104.

As also shown in FIG. 5, an exemplary configuration of the receiver unit 104 is battery powered and includes a power saving motion detector 110 for powering an R.F. receiver 112 with associated signal detectors 114 and corresponding counterparts of the alarm circuit 16 that is described above, for separately indicating transmitted signals from each of the transmitters 108a and 108b. Each transmitter unit 100 is provided with an electronic enclosure 116 that is mounted to the support clamp 20 as shown in FIGS. 6 and 7 for protecting components of the filter and transmitter circuitry while permitting clamping attachment to different forms of the vehicle structure 23 proximate front and rear wheels of the vehicle (not shown).

As most clearly shown in FIGS. 8-10, each of the probe units 100 and 102 includes circuitry similar to the filter circuit 14 as described above, with like designations for corresponding elements, but without the warning signal C, the logic diodes 82 and 84, and the pull-down resistor 80. Instead, the filter 106 has a V- output that corresponds to the signal B of the filter circuit 14, and a V+ output that is similar to the signal A of the filter circuit 14, but inverted by an additional counterpart of the inverters 64. The V+ and V- outputs drive a positive bus 120 and a negative bus 122, respectively, of the transmitter 108 such that the transmitter 108 is inoperative, requiring substantially no power, unless the positive bus is driven positively to the voltaqe at the power bus 56 while at the same time the negative bus is driven negatively to ground. As shown in FIG. 10, the transmitter circuit 124 has a low power configuration and includes a radiating antenna coil L1 that is operative at a carrier frequency that is determined by an inductor L2 and capacitor C1, with another capacitor C2 providing regenerative feedback, and a modulating crystal 124 that is selected to provide a different modulation frequency for each of the front probe unit 100 and the rear probe unit 102. In other respects the transmitter circuit 124 is conventional, requiring only about 1 mA during operation, and essentially no power when disabled by the positive bus 120 and the negative bus 122 being at the same voltage.

Depending upon local regulations, the carrier frequency can be from about 20 MHz to about 60 MHz, 27 MHz and 49 MHz being exemplary frequencies. The modulation frequency can be selected from a set of frequencies that includes 32.768 kHz, 40 kHz, and 50 kHz. Preferably, the front transmitter 108a is modulated at 32.768 kHz, and the rear transmitter 108b is modulated at either 40 kHz or 50 kHz, the crystals 124 being conventionally available at these resonant frequencies. These combinations provide substantial signal separation and absence of direct frequency multiples for reliable detection by the receiver unit 104.

As most clearly shown in FIGS. 12 and 13, the motion detector 110 of the receiver unit 104 includes an acceleration-sensitive spring switch 130 that produces a contact closure when the apparatus 10 is subjected to vehicle acceleration. The switch 130 includes a conductive post 132 that is rigidly cantilevered from a circuit substrate 134, and a very fine conductive helical spring 136 that is also cantilevered from the substrate 134 in coaxial relation to the post 132. Acceleration in the plane of the substrate causes a lateral deflection of the spring 136, readily producing the momentary contact. The substrate 134 is provided with circuit paths 138 and 140 of the motion detector 110 that are respectively connected to the post 132 and the spring 136.

The motion detector 110 is powered by receiver battery means 142 that includes a pair of series-connected receiver battery cells 144 for powering a source bus 145. The battery means 142 also includes provisions for receiving power from a vehicle electrical system 146, including a power terminal 148 and a ground terminal 150. Although the connection to the electrical system 146 can be at a switched voltage source such as by means of an ignition switch as depicted in FIG. 12, a preferred arrangement is connection to a more readily accessible location such as a cigarette lighter socket 182 as shown in FIG. 13, wherein the receiver unit 104 is provided with a power cord 184 having a conventional accessory lighter plug 186, the plug 186 incorporating the power terminal 148 and the ground terminal 150, being adapted to be connectively received by the socket 182. As also shown in FIG. 13, the receiver unit 104 is provided with a housing 192 that is mounted to an interior vehicle surface 194 by means of a plurality of suction cups 196. Further, the housing 192 incorporates two of the optical transducers 88, each being associated with a corresponding one of the front probe unit 100 and the rear probe unit 102.

An important feature of the present invention is that the motion detector 110 of the receiver unit 104 makes possible just such a direct, unswitched connection to the electrical system 145, because of the extremely low power consumption by the apparatus 10 over long periods of time. Thus the vehicle can be left unattended with impunity, even with the probe switch closed as a result of contact with an obstruction 24, without significantly draining the battery of the vehicle electrical system 145. A Zener diode 152 is connected between the source bus 146 and ground for preventing an overvoltage condition on the source bus in the event that the electrical system 146 is of substantially higher voltage than the source bus 146, such as 12 V from the vehicle system 146 and 3 V on the source bus 145. The Zener voltage is selected to be slightly higher than the nominal voltage of the source bus 145 so that essentially no current flows in the diode 152 when the vehicle electrical system 146 is not connected. A dropping resistor 154 is connected between the power terminal 148 and the source bus 145 for limiting the current through the Zener diode 152. It is to be understood that CMOS integrated circuitry is customarily capable of operating at a supply voltage of between 3 and about 15 volts. Thus it would be possible to power the same receiver unit 104 with 3 V from the battery cells 144 and, after removing one or both of the cells 144, directly from a 12 V source. One possible problem, however, is that the receiver 112 and detectors 114 may operate differently at the two voltages. Accordingly, and for overvoltage protection, the Zener diode 152 is provided in the preferred configuration of the receiver unit 104.

As shown in FIG. 12, the spring switch 130 is connected for rapidly charging, during the contact closures thereof, a first filter capacitor 156 through a limiting resistor 158, the capacitor 156 otherwise being slowly discharged through a discharge resistor 160. When the capacitor 156 is charged sufficiently positively, an electrolytic second filter capacitor 162 is rapidly discharged through a discharge diode 164, the discharge diode 164 being driven by a counterpart of the inverter 64 in response to the voltage on the first filter capacitor 156. At other times, the second filter capacitor 164 is slowly charged to the source bus 145 through a charging resistor 166. Another of the inverters 64 is connected for driving a receiver power bus 168 in response to the voltage on the second filter capacitor 162. A typical vehicle acceleration event produces a series of short-duration contact closures of the spring switch 130, followed by the absence of closures during a period of perhaps several seconds. This is because the spring 136 tends to resonate as it bangs against the post 132, there being only very slight damping of the vibrations. The series of closures produces a corresponding series of discharge current pulses in the discharge diode 164 with the result that the second filter capacitor 162 typically becomes discharged completely before the series dies out. The combination of the second filter capacitor 162 and the charging resistor 166 is selected to prolong activation of the power bus 168 for at least 10 seconds following the complete discharge of the second filter capacitor. As shown in FIG. 12, preferred values of 10 uF for the capacitor 162 and 6.8 M for the resistor 166 provide a time constant of about 68 seconds, leading to an interval of about 30 seconds during which the power bus 168 remains powered following the discharge of the filter capacitor 162.

As further shown in FIG. 12, the R.F. receiver 112, the detectors 114, and the alarm circuits 16 are powered from the power bus 168, being activated only during and for approximately 30 seconds after accelerative movement of the apparatus 10. An exemplary configuration of the receiver 112 includes an antenna coil 170 in a conventional low power regenerative band-pass amplifier having a frequency selective tank circuit 172 for tuning to the common carrier frequency of the transmitters 108a and 108b, described above. Tuned R.F. appears at an R.F. output 174 of the receiver 112, the output 174 being fed to each of the detectors 114a and 114b. Each detector 114 includes a rectifying filter circuit 176 that is fed from a crystal-resonant band-pass amplifier stage 178, each amplifier stage 178 incorporating a detector crystal 180 that is selected for matching the modulation frequency of the associated transmitter 108. In particular, the detector 114a is provided with a detector crystal 180 that is frequency matched with the modulating crystal 124 of the transmitter 108a of the front probe unit 100; and the detector 114b has its crystal 180 selected for frequency matching the modulating crystal 124 of the transmitter 108b of the rear probe unit 102. Similarly, the associated alarm circuits 16 are adapted for producing different buzzer tones, each of the tones being associated with its corresponding probe unit. For correct signal polarity, the alarm circuits 16 are each driven from the rectifying filters 176 by further counterparts of the inverters 64, each being connected thereto by a respective warning connection 190, designated connections 190a and 190b in the drawings.

Although the present invention has been described in considerable detail with reference to certain preferred versions thereof, other versions are possible. For example, other battery voltages such as 6 V, 9 V, and 12 V can be used for powering the alarm unit 50, the probe units 100 and 102, as well as the receiver unit 104. Also, the Zener diode 152 and the limiting resistor 154 of the receiver battery means 142 can be omitted when the receiver unit is to be powered only from the vehicle electrical system 146. Further, tightly wound coils of the coil portion 30 can tightly grip a separate shank portion 36 of the arm member 22, for allowing different materials to be used. Moreover, frequency modulation (FM) of the transmitters 108 can be used instead of the amplitude modulation that is described above. Therefore, the spirit and scope of the appended claims should not necessarily be limited to the description of the preferred versions contained herein.

What is claimed is:

1. A vehicle detector apparatus for warning an operator of an impending obstruction, comprising:
   (a) a base adapted for attachment to an existing external structure of the vehicle;
   (b) a probe having an arm for contacting the obstruction, the arm having a first end proximate the base and a second end, the second end being capable of deflecting relative to the base when contacting the obstruction;
   (c) means for producing a contact signal upon the occurrence of a predetermined deflection of the second end of the arm;
   (d) filter means for producing a warning signal in response to the contact signal, the filter means being adapted for preventing occurrence of the warning signal in response to spurious occurrences of the contact signal, the filter means being further adapted for terminating the warning signal after a predetermined continuous occurrence of the contact signal; and
   (e) transducer means for indicating the warning signal to the operator.

2. The apparatus of claim 1 wherein the transducer means comprises visual display means.

3. The apparatus of claim 1 wherein the transducer means comprises sound producing means.

4. The apparatus of claim 1 further comprising:
   (a) battery means mounted on the base;
   (b) radio transmitter means on the base, the transmitter means being powered by the battery means for producing a radio transmission in response to the contact signal; and
   (c) radio receiver means for receiving the radio transmission within the vehicle, the receiver being operatively connected to the transducer means.

5. A vehicle detector apparatus for warning an operator of an impending obstruction, comprising:
   (a) a base adapted for attachment to an existing external structure of the vehicle;
   (b) a probe having an arm for contacting the obstruction, the arm having a first end proximate the base and a second end, the second end being capable of deflecting relative to the base when contacting the obstruction;
   (c) means for producing a contact signal upon the occurrence of a predetermined deflection of the second end of the arm;
   (d) filter means for producing a warning signal in response to the contact signal, comprising timer means for producing the warning signal after continuous occurrence of the contact signal for a predetermined first period of time for preventing occurrence of the warning signal in response to spurious occurrences of the contact signal; and
   (e) transducer means for indicating the warning signal to the operator.

6. The apparatus of claim 5 wherein the first period of time of the filter means is between approximately 0.05 seconds and approximately 1.0 seconds.

7. The apparatus of claim 6 wherein the first period time is approximately 0.2 seconds.

8. The apparatus of claim 5 wherein the timer means further comprises means for preventing occurrence of the warning signal after continuous occurrence of the contact signal for a predetermined second period of time, the second period of time being greater than the first period of time.

9. The apparatus of claim 8 wherein the second period of time is approximately 20 times the magnitude of the first period of time.

10. The apparatus of claim 8 wherein the second period of time is between approximately 10 seconds and approximately 40 seconds.

11. The apparatus of claim 8 wherein the second period of time is approximately 25 seconds.

12. The apparatus of claim 8 wherein the timer means comprises an electrical circuit comprising:
   (a) delay means for maintaining an enable signal at a rest level during the first period of time and at an enable level thereafter, the delay means immediately returning the enable signal to the rest level in the absence of the contact signal;
   (b) timeout means for maintaining a valid signal at a rest level during the second period of time and at a disable level thereafter, the timeout means immediately returning the valid signal to the rest level in the absence of the contact signal; and
   (c) means for producing the warning signal only when the enable signal is at the enable level and the valid signal is at the rest level.

13. The apparatus of claim 12 wherein the delay means and the timeout means each comprise a CMOS circuit element.

14. The apparatus of claim 12 wherein the means for producing the warning signal only when the enable signal is at the enable level and the valid signal is at the rest level comprises:
   (a) means for connecting a load power input to a first voltage only when the enable signal is at the enable level; and
   (b) means for connecting a load power return to a second voltage only when the valid signal is at the rest level.

15. The apparatus of claim 14 wherein each of the means for connecting comprises a CMOS circuit element.

16. The apparatus of claim 5 wherein the transducer means comprises visual display means.

17. The apparatus of claim 5 wherein the transducer means comprises sound producing means.

18. A vehicle detector apparatus for warning an operator of an impending obstruction, comprising:
   (a) a base adapted for attachment to an existing external structure of the vehicle;
   (b) a probe having an arm for contacting the obstruction, the arm having a first end proximate the base and a second end, the second end being capable of deflecting relative to the base when contacting the obstruction;
   (c) means for producing a contact signal upon the occurrence of a predetermined deflection of the second end of the arm;
   (d) battery means mounted on the base;
   (e) radio transmitter means on the base, the transmitter means being powered by the battery means for producing a radio transmission in response to the contact signal;
   (f) limiting means for limiting operation of the transmitter means for conserving power in the battery means in response to the contact signal;
   (g) radio receiver means for receiving the radio transmission within the vehicle; and
   (h) transducer means for indicating a warning signal to the operator in response to the radio receiver means.

19. The apparatus of claim 18 further comprising filter means for producing a warning signal in response to the contact signal, the filter means being adapted for preventing occurrence of the warning signal in response to spurious occurrences of the contact signal, wherein the limiting means comprises the filter means, whereby the transmitter means is operational only in the presence of the warning signal.

20. The apparatus of claim 19 wherein the filter means comprises an electrical circuit comprising:
   (a) delay means for maintaining an enable signal at a rest level during a first period of time in response to the contact signal and at an enable level thereafter, the delay means returning the enable signal to the rest level in the absence of the contact signal;
   (b) timeout means for maintaining a valid signal at a rest level during a second period of time in response to the contact signal and at a disable level thereafter, the timeout means returning the valid signal to the rest level in the absence of the contact signal; and
   (c) means for producing the warning signal only when the enable signal is at the enable level and the valid signal is at the rest level.

21. The apparatus of claim 20 wherein the means for producing the warning signal only when the enable signal is at the enable level and the valid signal is at the rest level comprises:
   (a) means for connecting a power input of the transmitter to a first voltage only when the enable signal is at the enable level; and
   (b) means for connecting a power return of the transmitter to a second voltage only when the valid signal is at the rest level.

22. The apparatus of claim 21 wherein each of the means for connecting comprises a CMOS circuit element.

23. A vehicle detector apparatus for warning an operator of an impending obstruction, comprising:
   (a) a base adapted for attachment to an existing external structure of the vehicle;
   (b) a probe having an arm for contacting the obstruction, the arm having a first end proximate the base and a second end, the second end being capable of deflecting relative to the base when contacting the obstruction;
   (c) means for producing a contact signal upon the occurrence of a predetermined reflection of the second end of the arm;
   (d) transmitter battery means mounted on the base;
   (e) radio transmitter means on the base, the transmitter means being powered by the battery means for producing a radio transmission in response to the contact signal;
   (f) radio receiver means for receiving the radio transmission within the vehicle;
   (g) transducer means for indicating a warning signal to the operator in response to the radio receiver means;
   (h) receiver battery means operatively connected to the receiver means and the transducer means; and
   (i) motion detector means for preventing power consumption by the receiver means and the transducer means during periods of inactivity of the vehicle.

24. The apparatus of claim 23 wherein the receiver battery means comprises means for connecting the receiver means and the transducer means to an electrical system of the vehicle.

25. The apparatus of claim 23 wherein the motion detector means comprises a normally open spring contact adapted for momentarily closing an electrical circuit path in the presence of acceleration motion of the apparatus, and a holding circuit for connecting the receiver means to the receiver battery means for a period of at least about 10 seconds of time from the occurrence of the momentary closing of the circuit path.

26. A vehicle detector apparatus for warning an operator of an impending obstruction, comprising:
   (a) a base adapted for attachment to an existing external structure of the vehicle;
   (b) a probe having an arm for contacting the obstruction, the arm having a first end proximate the base and a second end, the second end being capable of deflecting relative to the base when contacting the obstruction;
   (c) means for producing a contact signal upon the occurrence of a predetermined deflection of the second end of the arm;
   (d) battery means mounted on the base;
   (e) radio transmitter means on the base, the transmitter means being powered by the battery means for producing a radio transmission in response to the contact signal;
   (f) radio receiver means within the vehicle for receiving the radio transmission; and
   (g) transducer means for indicating a warning signal to the operator in response to the radio receiver means,
   wherein the base, the probe, the means for producing the contact signal battery means, and the transmitter means are included in a first detector unit for mounting in a first location on the vehicle, the transmitter means of the first detector unit being operable at a first signal frequency, the apparatus further comprising a second detector unit adapted for mounting at a second location on the vehicle, the transmitter means of the second detector unit being operable at a second signal frequency, the second signal frequency being different than the first signal frequency.

27. A vehicle detector apparatus for warning an operator of an impending obstruction, comprising:
   (a) a base adapted for attachment to an existing external structure of the vehicle;
   (b) an arm for contacting the obstruction, the arm having a first end proximate the base and a second end, the second end being capable of deflecting relative to the base when contacting the obstruction;
   (c) means for producing a contact signal upon the occurrence of a predetermined deflection of the second end of the arm;
   (d) battery means mounted on the base;
   (e) radio transmitter means on the base, the transmitter means being powered by the battery means for producing a radio transmission in response to the contact signal;
   (f) means for preventing power consumption by the transmitter means except when the radio transmission is indicative of the contact signal;
   (g) radio receiver means within the vehicle, the receiver means producing a warning signal in response to the radio transmission from the transmitter means; and
   (h) transducer means operatively connected to the receiver means, for indicating the warning signal to the operator.

* * * * *